(12) United States Patent
Yee et al.

(10) Patent No.: US 6,378,825 B1
(45) Date of Patent: Apr. 30, 2002

(54) CONTROL AND POWER TERMINAL BLOCK QUICK INSERT/DISCONNECT

(75) Inventors: Edgar Yee, Chapel Hill; Gilbert A. Soares; Richard E. Bernier, both of Mebane; Charles Piper, Burlington, all of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/474,494

(22) Filed: Dec. 29, 1999

(51) Int. Cl.⁷ .............................................. A47B 96/00
(52) U.S. Cl. ............................ 248/221.11; 248/225.11; 439/532; 439/540; 439/716
(58) Field of Search ..................... 248/221.11, 222.14, 248/224.51, 225.11, 220.21, 235, 243, 244, 254, 278.1; 83/559, 620, 640; 439/532, 716

(56) References Cited

U.S. PATENT DOCUMENTS

| | | | |
|---|---|---|---|
| 3,636,894 A | * 1/1972 | Hage | 248/188 |
| 4,878,856 A | * 11/1989 | Maxwell | 439/541.5 |
| 4,921,445 A | 5/1990 | Herbert | |
| 5,033,711 A | * 7/1991 | Greorich et al. | 248/664 |
| 5,142,958 A | 9/1992 | Nordlin et al. | |
| 5,146,824 A | * 9/1992 | Lajoie | 83/90 |
| 5,192,227 A | 3/1993 | Bales | |
| 5,267,876 A | * 12/1993 | Rupert et al. | 439/540 |
| 5,362,259 A | 11/1994 | Bolliger | |
| 5,529,273 A | * 6/1996 | Benthin | 248/254 |
| 5,704,805 A | * 1/1998 | Douty et al. | 439/532 |
| 5,768,091 A | 6/1998 | Vinson et al. | |
| 5,788,198 A | * 8/1998 | Sharpe | 248/210 |
| 5,887,836 A | 3/1999 | Back | |
| 6,045,103 A | * 4/2000 | Costa et al. | 248/278.1 |
| 6,068,319 A | * 5/2000 | O'Brien | 248/243 |
| 6,098,566 A | * 8/2000 | Metcalf | 248/235 |

* cited by examiner

Primary Examiner—Ramon O. Ramirez
Assistant Examiner—Tan Le
(74) Attorney, Agent, or Firm—Cantor Colburn LLP; Carl B. Horton

(57) ABSTRACT

An L-shaped bracket for mounting DIN rail comprising a support member, a base member, and a brace positioned therebetween to give support to the L-shaped structure. The support member has a rail mounting pin protruding therefrom, which comprises a shank with an oblong head disposed on the end of the shank. A hole for receiving a fastener is disposed on the support member adjacent to the rail mounting pin. A bracket mounting pin protrudes from the base member and comprises a retaining pin and a retaining foot disposed on the end thereof. The retaining pin is dimensioned and configured to slidably engage a slot in a bracket mounting plate and be retained in the slot by the retaining foot. A post also protrudes from the base member and is dimensioned to be received in a post hole. A relief is cut laterally into the base member and extends into the brace to allow the support member and the base member to flex relative to each other.

30 Claims, 5 Drawing Sheets

CONTROL AND POWER TERMINAL BLOCK QUICK INSERT/DISCONNECT

BACKGROUND OF THE INVENTION

The present invention relates to mounting DIN rail brackets without using hardware, and more particularly, to a DIN rail mounting system in which a DIN rail is mounted on brackets which are in turn secured to a surface by mating feet and posts on the bracket with their respective receiving slots and holes in the surface.

Electrical components are typically mounted to electrical panels by fastening the components to a DIN rail. A DIN rail is an elongated raised track or channel shaped strip having opposed coplanar flanges along its length and which comes in a variety of cross-sectional shapes that are designed to provide an area within which the electrical components are fixed. Mounting components on a DIN rail requires that the component being mounted have a locking mechanism and a release mechanism that typically includes a movable or flexible part which can be released from the DIN rail. U.S. Pat. No. 4,921,445 entitled "Rail Mounting Apparatus for Electrical Components" discloses a rail mounting apparatus in which a spring clamp is held flexibly in position such that the clamp slides onto the rail. Other more complex mechanisms include a flexible latching member formed as an integral part of the device to be mounted and a spring-biased sliding latch which engages the DIN rail.

Generally, mounting slots or holes are cut or punched along the length of the rail to facilitate the mounting of the rail on brackets which are then mounted on a surface relative to an electrical panel. The DIN rail mounting bracket is typically an L-shaped bracket designed for attachment to a flat surface. This L-shaped bracket usually includes holes on one leg for attaching the DIN rail to the bracket and holes on the adjacent leg for attaching the bracket to the mounting surface. Presently, a very common method of securing the DIN rail to the mounting brackets is to insert bolts, screws, or rivets through the holes of the L-shaped bracket and the DIN rail thus securing the DIN rail to one leg of the bracket. The use of bolts, screws, or rivets adds the costs of the hardware to the finished product, as well as increases the costs of labor involved with bolting, screwing, or riveting the bracket into place. Other methods of securing DIN rail to a panel involve the integral molding of the rail into the casing of a circuit breaker box.

The mounting bracket is typically held to a flat surface such as an electrical panel using a plurality of bolts, screws, or rivets. As with securing the DIN rail to the bracket, the use of bolts, screw, or rivets adds to the cost of the finished product. Alternately, the mounting bracket can be secured to the flat surface by welding it in place. This method provides strong support for the bracket and DIN rail; however, it is inflexible, as the support cannot be detached and repositioned within the electrical system. Another method of securing an L-shaped bracket to a surface is disclosed in U.S. Pat. No. 5,768,091 entitled "Circuit Breaker Mounting Bracket", which recites a flange depending from a base member of the bracket wherein the flange is fixably attached to the surface while a brace member rests on the surface and supports an upright member.

One problem encountered with electrical components mounted on DIN rails is that the pulling, twisting, or torque action experienced when installing or removing the components may cause the mounting brackets to be dislodged from the surface. Even electrical devices equipped with quick release mechanisms allowing for easy clamping to a DIN rail may put undue stresses on the brackets thereby causing loosening of the bolts, screws, or rivets that hold the bracket to the surface. Loose bolts, screws, or rivets may compromise the quality of the electrical system and present a hazardous condition.

SUMMARY OF THE INVENTION

In an exemplary embodiment of the invention, a bracket for mounting DIN rail has an L-shaped structure and comprises a support member having a rail mounting pin protruding outward therefrom, a hole disposed adjacent the rail mounting pin, a base member extending perpendicularly from the support member and having a bracket mounting pin and a post protruding outward from the base member, and a brace member positioned between the support member and the base member to give support to the L-shaped structure. A relief is cut laterally across the base member and extends into the brace to allow the support member and the base member to flex relative to each other.

The rail mounting pin is an oblong-shaped head positioned on the end of a shank, the head being configured and dimensioned to engage a receiving hole in the DIN rail and retain the DIN rail against the support member when the DIN rail is placed over the head and rotated through a ninety degree turn. The hole positioned adjacent the rail mounting pin is dimensioned to receive a fastener positioned therethrough and extending through a second hole in the DIN rail. Use of such a fastener prevents the axial rotation of the DIN rail on the shank when the rail mounting pin engages the receiving hole in the DIN rail.

A bracket mounting pin depends from the base member. The bracket mounting pin comprises a foot retaining pin and a retaining foot disposed on the end thereof. The foot retaining pin is dimensioned to slidably engage a slot in a surface and remain in the slot due to frictional resistance between the retaining pin and the edges of the slot. The retaining foot is dimensioned to prevent the bracket from being perpendicularly removed from the slot. A post also protrudes outward from the base member and either snappingly or frictionally engages a post hole to further assist in retaining the bracket on the surface.

Rail mounting pins, bracket mounting pins, and posts allow the DIN rail to be mounted to the L-shaped bracket and the L-shaped bracket to be mounted to a surface without utilizing hardware and tools thus avoiding the costs associated with hardware and tools. Mounting of the brackets to a surface by slidably engaging the foot with a slot and inserting a post into a post hole will enable the brackets to remain secure while supporting a DIN rail and electrical components attached thereto.

DESCRIPTION OF THE PREFERRED EMBODIMENTS

Figure 1:
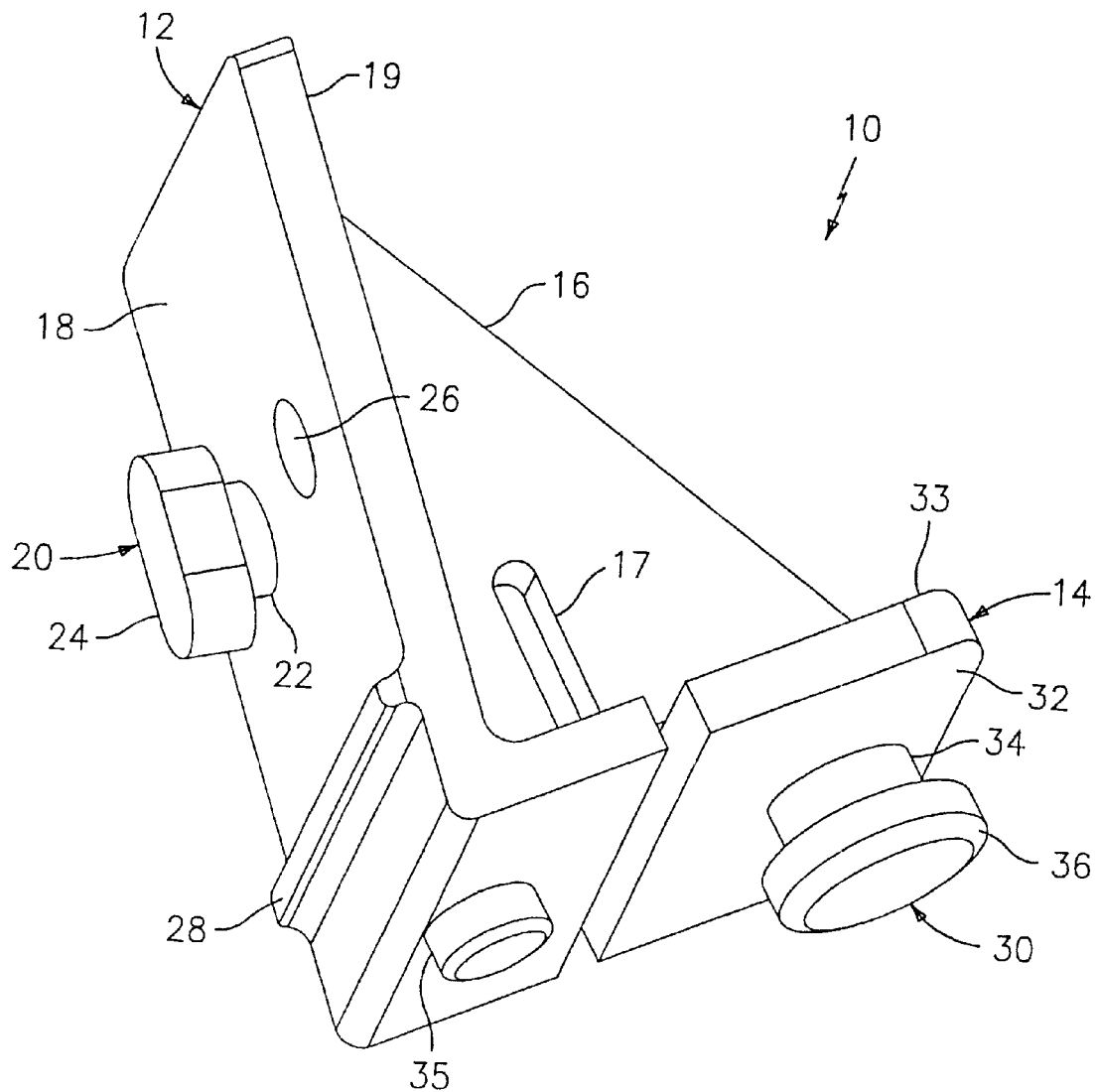
FIG. 1 is a perspective view of an L-shaped mounting bracket for mounting DIN rail, of the present invention.
Figure 2:
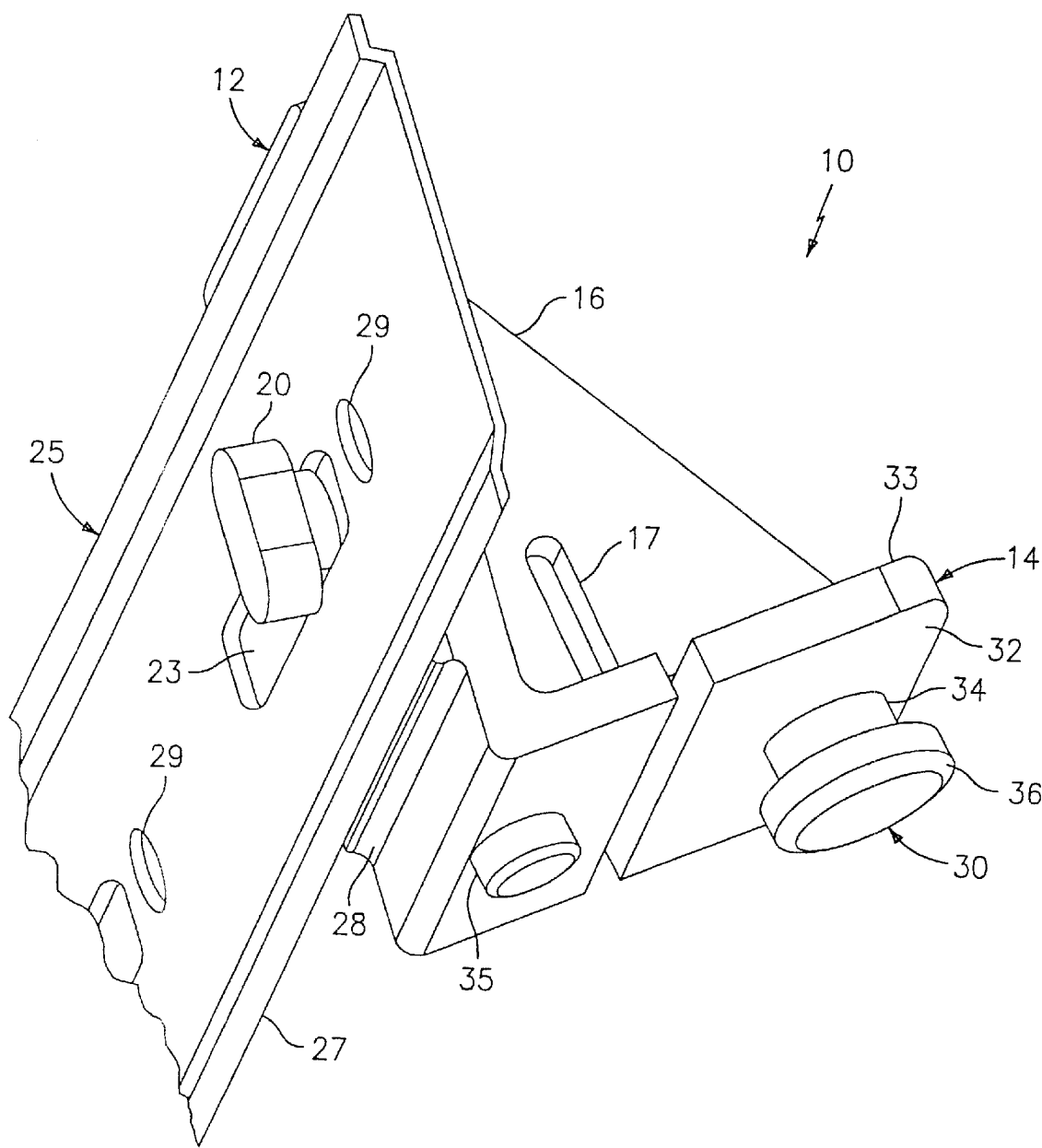
FIG. 2 is a perspective view of the L-shaped mounting bracket of FIG. 1 having DIN rail mounted to the bracket.

Referring to FIGS. 1 and 2, a mounting bracket of an exemplary embodiment of the present invention is generally shown at 10. Mounting bracket 10 is comprised of an L-shaped member having a support member 12, a base member 14, and a brace 16 extending between members 12 and 14. Support member 12 of bracket 10 extends substantially perpendicularly from a surface to which electrical devices are to be mounted, while the plane of base member 14 engages the surface.

Support member 12 of bracket 10 has an outer surface 18 and a back side 19. A rail mounting pin 20 projects from outer surface 18 and is comprised of a shank 22 and a head 24 disposed on the end of shank 22. Head 24 is of a generally oblong shape. A cross sectional shape of head 24 is larger than a cross sectional shape of shank 22. Furthermore, cross sectional shape of head 24 is dimensioned to be similar to a shape of an oblong slot 23 in a DIN rail 25 thereby enabling head 24 to be received in oblong slot 23. Head 24 is configured to retain DIN rail 25 on shank 22 between outer surface 18 and an underside of head 24 when oblong slot 23 in DIN rail 25 is received by rail mounting pin 20 and when rail mounting pin 20 is rotated through a ninety degree turn. Shank 22 is dimensioned to be of sufficient length to snugly accommodate DIN rail 25 between the underside of head 24 and DIN rail 25. Alternately, rail mounting pin 20 may be configured to be snappingly received in oblong slot 23 of DIN rail 25.

A hole 26 is disposed adjacent rail mounting pin 20 in support member 12 and extends completely through support member 12. When head 24 of rail mounting pin 20 is inserted through oblong slot 23 in DIN rail 25 and DIN rail 25 is rotated through a ninety degree turn, a hole 29 in DIN rail 25 aligns with hole 26 in support member 12. A fastener (not shown) such as a bolt or rivet may be inserted through holes 29 and 26 and secured to provide additional strength to the mounted DIN rail 25. Hole 26 may be threaded to threadedly receive a screw (not shown) thereby securing DIN rail 25 to support member 12.

A ridge 28 is furthermore disposed on outer surface 18 of support member 12 and is configured to extend perpendicularly to the general L-shape of bracket 10. Ridge 28 is raised up off outer surface 18 and provides a ledge-like surface along which DIN rail 25 is positioned. A flange 27 disposed on the edge of DIN rail 25 engages ridge 28 thereby providing proper alignment of DIN rail 25 with respect to bracket 10.

Base member 14 of bracket 10 has a lower surface 32 and an upper surface 33. A bracket mounting pin 30 is disposed on lower surface 32 of base member 14. Bracket mounting pin 30 depends from lower surface 32 and comprises a foot retaining pin 34 and a foot 36 disposed thereon. Foot 36 has a cross sectional shape that is larger than a cross sectional shape of foot retaining pin 34. Each foot retaining pin 34 is positioned and dimensioned to slidably engage a slot 40 disposed in a plate (shown below with reference to FIG. 5). Mounting pin 30 is positioned on a longitudinal axis of base member 14 such that foot retaining pin 34 is positioned linearly with a post 35 also depending from base member 14.

Bracket 10 also includes brace 16, which is a generally triangularly shaped member positioned within the general L-shape of bracket 10. One edge of brace 16 is fixedly mounted to back side 19 of support member 12. An adjacent edge of brace 16 is fixedly mounted to upper surface 33 of base member 14. Brace 16 is configured and dimensioned to provide support for members 12 and 14 of bracket 10 and contains a cut-out relief 17 extending laterally through base member 14 into brace 16 to allow support member 12 and base member 14 to flex relative to each other.

Figure 3:
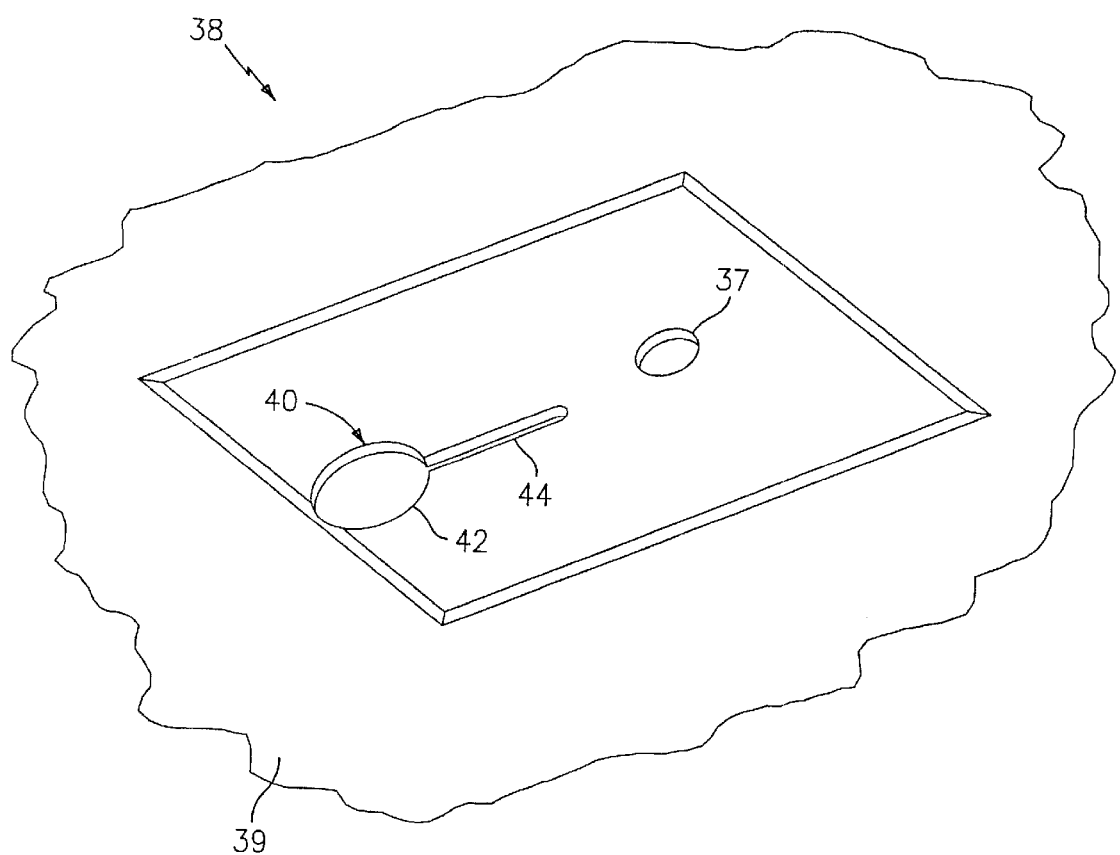
FIG. 3 is a perspective view of a plate, of the present invention, having a slot and a hole disposed therein and mounted to a surface.

Referring to FIG. 3, plate is generally shown at 38. Plate 38 is mounted on a surface 39 of an electrical box (not shown) and has disposed within it a slot 40, which corresponds to the positioning of bracket mounting pin 30 on bracket 10. Slots 40 are dimensioned to allow foot retaining pins 34 to slide through narrower openings 44 under an application of a slight force, but remain secured within narrower openings 44 due to frictional resistance between the edges of narrower openings 44 and foot retaining pins 34 once the force is removed. Feet 36 are dimensioned to exceed a width of narrower opening 44 thus causing bracket 10 to be retained in narrower openings 44 and preventing brackets 10 from being perpendicularly removed from surface 39 by exertion of a force on bracket 10 perpendicular to surface 39 while foot retaining pins 34 are slidably engaged with narrower openings 44.

Figure 4:
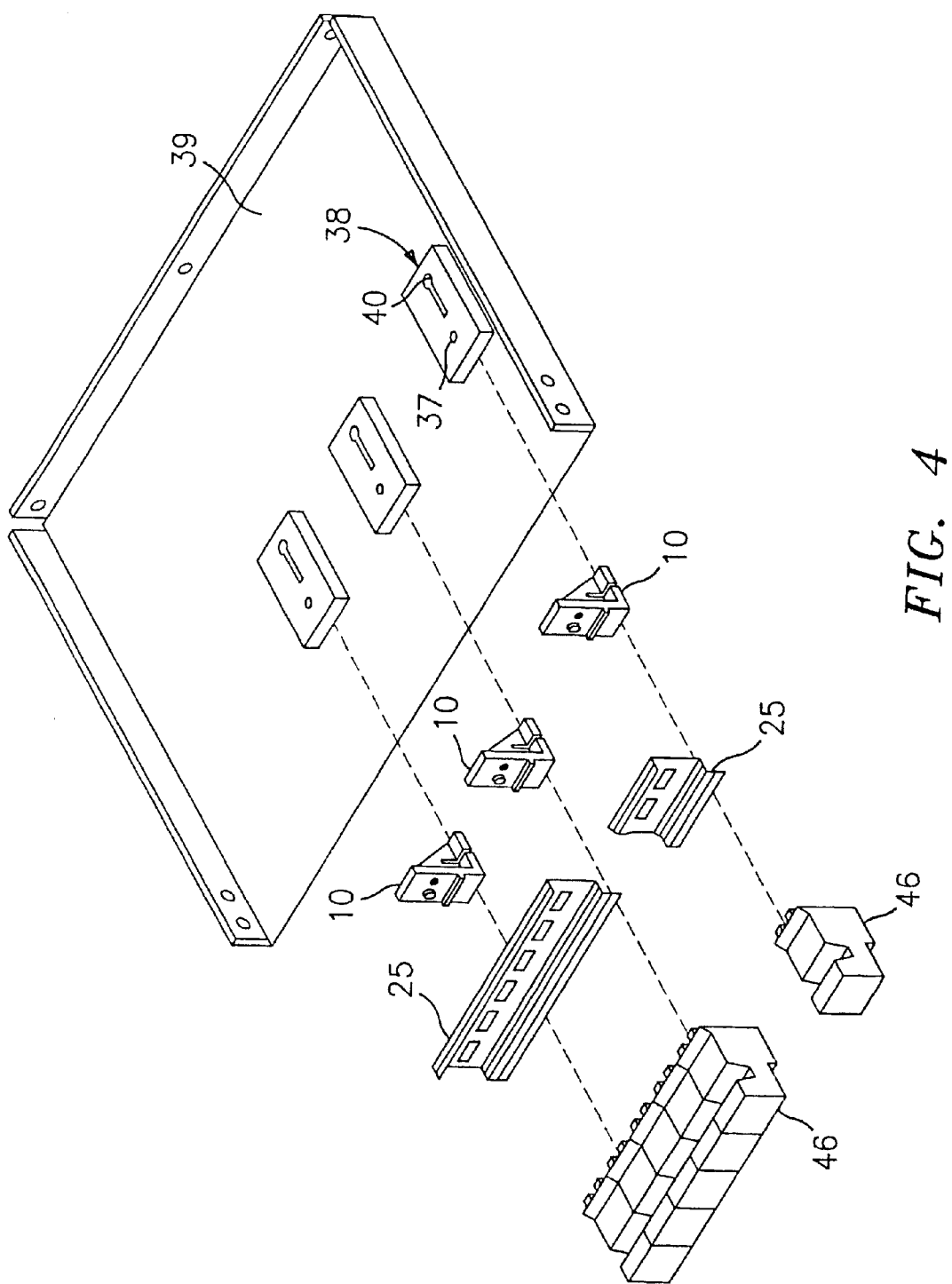
FIG. 4 is an exploded view of electrical components being mounted to DIN rail, the DIN rail being mounted to brackets, of the present invention, the brackets being mounted on plates, of the present invention, and the plates being mounted on a surface of an electrical panel.

Plate 38 also has a post hole 37 disposed adjacent to an end of narrower opening 44 for receiving post 35. Tension resulting from the flexing of members 12 and 14 enables bracket 10 to be retained in slot 40 and post hole 37. In FIG. 4, an exploded view of a system illustrates electrical components 46 being mounted to DIN rail 25, which are in turn mounted to brackets 10. Brackets 10 then slidably engage slots 40 and post holes 37 on plates 38 mounted on surface 39.

Once bracket mounting pin 30 is secured in narrower opening 44, bracket 10 is flexed and post 35 is received in post hole 37. Post 35 may be snappingly or frictionally retained in post hole 37. The combination of post 35 received and retained in post hole 37 and foot 36 received in narrower opening 44 causes bracket 10 to be secured to plate 38. The removal of bracket 10 entails flexing bracket 10 slightly to remove post 35 from post hole 37 and sliding bracket 10 in the direction of wider opening 42 so that foot retaining pin 34 disengages narrower opening 44 and foot 36 can be removed through wider opening 42.

Figure 5:
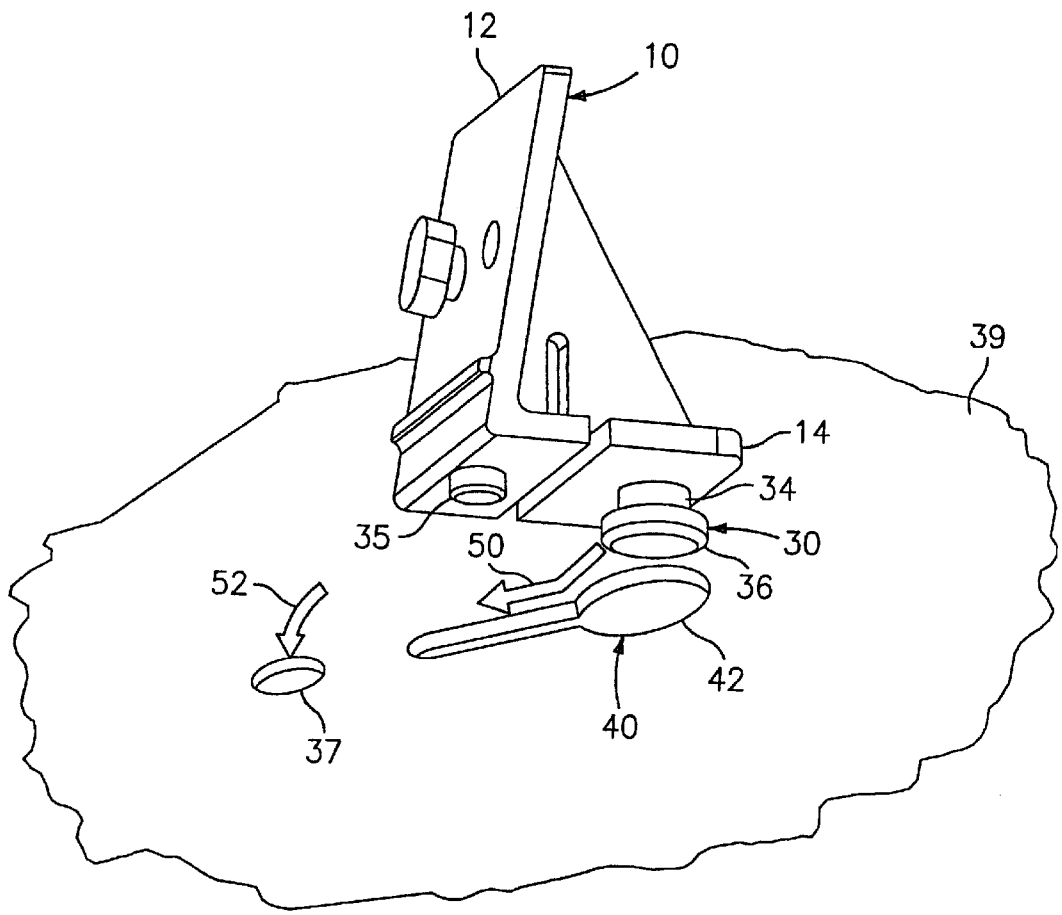
FIG. 5 is a perspective view of the bracket, of the present invention, being received in a slot and a post hole on a plate, of the present invention.

Alternately, slot 40 and post hole 37 can be cut directly into surface 39 thereby avoiding any need for plate 38. Referring to FIG. 5, bracket 10 is shown being mounted directly in such a manner. The end of bracket 10 having bracket mounting pin 30 depending therefrom is moved in the direction of first arrow 50 so that bracket mounting pin 30 is received in wider opening 42 of slot 40 and slidably engages narrower opening 44. Once bracket mounting pin 30 is fully engaged in slot 40, members 12 and 14 are flexed sufficiently and moved in the direction of second arrow 52 to allow post 35 to be inserted into post hole 37.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An attachment system for mounting a DIN rail comprising:

a bracket comprising,
a support member having a rail mounting pin depending therefrom, and
a base member extending generally perpendicularly from said support member and having at least one bracket mounting pin depending therefrom and at least one post depending therefrom;
a mounting plate having at least one slot defined therein and at least one post hole defined therein, said at least one bracket mounting pin being received in said at least one slot and said at least one post being received in said at least one post hole to retain said bracket at said mounting plate; and
a ridge is disposed on a surface of said support member to facilitate an alignment of said DIN rail thereon.

2. The attachment system of claim 1 wherein said rail mounting pin is comprised of a shank projecting perpendicularly from said support member and a head having a substantially oblong shape disposed on an end of said shank, said head being dimensioned and positioned to be received in an oblong opening in said DIN rail, and wherein said head is configured to retain said DIN rail between said head and said support member when one of said DIN rail or said support member is rotated relative to the other of said DIN rail or said support member.

3. The attachment system of claim 1 wherein said support member has a hole disposed therein, said hole being configured and dimensioned to receive a fastener through said DIN rail and said hole thereby preventing axial rotation of said DIN rail on said rail mounting pin.

4. The assembly system of claim 1 wherein said at least one bracket mounting pin comprises a leg member depending from said base member to slidably engage said slot in said mounting plate.

5. The assembly system of claim 4 wherein said leg member has a retaining member disposed on an end thereof, said retaining member being dimensioned to have a greater width than said slot thereby causing said bracket to be retained in said slot when said leg member is slidably engaged in said slot.

6. The assembly system of claim 5 wherein said slot in said mounting plate is defined by a wider receiving hole and a narrower slit, said wider receiving hole being dimensioned to receive said retaining member, and said narrower slit being dimensioned to slidably receive said leg member and frictionally retain said leg member.

7. The assembly system of claim 6 wherein said retaining member has a tapered surface to facilitate insertion of said bracket into said wider receiving hole.

8. The assembly system of claim 1 wherein said at least one post comprises a protrusion depending from said base member to be received in said post hole in said mounting plate.

9. The assembly system of claim 1 wherein a brace member is secured to said support member and said base member.

10. The assembly system of claim 9 wherein said brace member has a cutout portion to facilitate flexing of said support member with respect to said base member.

11. The assembly system of claim 1 wherein said mounting plate comprises a surface of an electrical box.

12. The assembly system of claim 11 wherein said slot is defined by a wider receiving hole and a narrower slit, said wider receiving hole being dimensioned to receive said retaining member, and said narrower slit being dimensioned to slidably receive said leg member and frictionally retain said leg member.

13. The assembly system of claim 1 wherein a cross sectional shape of said rail mounting pin is dimensioned to correspond with a cross sectional shape of an opening in said DIN rail.

14. The assembly system of claim 13 wherein said rail mounting pin is configured and dimensioned to be snappingly received in said opening in said DIN rail.

15. An electrical enclosure comprising:
a DIN rail; and
an attachment system mounted to said DIN rail, said attachment
system including,
a bracket comprising,
a support member having a rail mounting pin depending therefrom, and
a base member extending generally perpendicularly from said support member and having at least one bracket mounting pin depending therefrom and at least one post depending therefrom;
a mounting plate having at least one slot defined therein and at least one post hole defined therein, said at least one bracket mounting pin being received in said at least one slot and said at least one post being received in said at least one post hole to retain said bracket at said mounting plate; and
a ridge is disposed on a surface of said support member to facilitate an alignment of said DIN rail thereon.

16. The electrical enclosure of claim 15 wherein said rail mounting pin is comprised of a shank projecting perpendicularly from said support member and a head having a substantially oblong shape disposed on an end of said shank, said head being dimensioned and positioned to be received in an oblong opening in said DIN rail, and wherein said head is configured to retain said DIN rail between said head and said support member when one of said DIN rail or said support member is rotated relative to the other of said DIN rail or said support member.

17. The electrical enclosure of claim 15 wherein said support member has a hole disposed therein, said hole being configured and dimensioned to receive a fastener through said DIN rail and said hole thereby preventing axial rotation of said DIN rail on said rail mounting pin.

18. The electrical enclosure of claim 15 wherein said at least one bracket mounting pin comprises a leg member depending from said base member to slidably engage said slot in said mounting plate.

19. The electrical enclosure of claim 18 wherein said leg member has a retaining member disposed on an end thereof, said retaining member being dimensioned to have a greater width than said slot thereby causing said bracket to be retained in said slot when said leg member is slidably engaged in said slot.

20. The electrical enclosure of claim 19 wherein said slot in said mounting plate is defined by a wider receiving hole and a narrower slit, said wider receiving hole being dimensioned to receive said retaining member, and said narrower slit being dimensioned to slidably receive said leg member and frictionally retain said leg member.

21. The electrical enclosure of claim 20 wherein said retaining member has a tapered surface to facilitate insertion of said bracket into said wider receiving hole.

22. The electrical enclosure of claim 15 wherein said at least one post comprises a protrusion depending from said base member to be received in said post hole in said mounting plate.

23. The electrical enclosure of claim 15 wherein a brace member is secured to said support member and said base member.

24. The electrical enclosure of claim 23 wherein said brace member has a cutout portion to facilitate flexing of said support member with respect to said base member.

25. The electrical enclosure of claim 15 wherein said mounting plate comprises a surface of an electrical box.

26. The electrical enclosure of claim 25 wherein said slot is defined by a wider receiving hole and a narrower slit, said wider receiving hole being dimensioned to receive said retaining member, and said narrower slit being dimensioned to slidably receive said leg member and frictionally retain said leg member.

27. The electrical enclosure of claim 15 wherein a cross sectional shape of said rail mounting pin is dimensioned to correspond with a cross sectional shape of an opening in said DIN rail.

28. The electrical enclosure of claim 27 wherein said rail mounting pin is configured and dimensioned to be snappingly received in said opening in said DIN rail.

29. An attachment system for mounting a DIN rail comprising:

a bracket comprising, a support member having a rail mounting pin depending therefrom, and a base member extending generally perpendicularly from said support member and having at least one bracket mounting pin depending therefrom and at least one post depending therefrom;

a mounting plate having at least one slot defined therein and at least one post hole defined therein, said at least one bracket mounting pin being received in said at least one slot and said at least one post being received in said at least one post hole to retain said bracket at said mounting plate; and a ridge is disposed on a surface of said support member to facilitate an alignment of said DIN rail thereon, said rail mounting pin is comprised of a shank projecting perpendicularly from said support member and a head having a substantially oblong shape disposed on an end of said shank, said head being dimensioned and positioned to be received in an oblong opening in said DIN rail, and wherein said head is configured to retain said DIN rail between said head and said support member when one of said DIN rail or said support member is rotated relative to the other of said DIN rail or said support member, said support member has a hole disposed therein, said hole being configured and dimensioned to receive a fastener through said DIN rail and said hole thereby preventing axial rotation of said DIN rail on said rail mounting pin, said at least one bracket mounting pin comprises a leg member depending from said base member to slidably engage said slot in said mounting plate, said at least one post comprises a protrusion depending from said base member to be received in said post hole in said mounting plate.

30. The attachment system of claim 29 wherein a brace member is secured to said support member and said base member, said brace member has a cutout portion to facilitate flexing of said support member with respect to said base member.

* * * * *